United States Patent [19]
Leuthold et al.

[11] Patent Number: 5,457,589
[45] Date of Patent: Oct. 10, 1995

[54] HUB-DISC INTERFACE REDUCING HUB RELOADED DISC SURFACE CURVATURE

[75] Inventors: Hans L. Leuthold, Santa Cruz; David J. Jennings, Watsonville; Gerold Heiner, Aptos; Donald J. MacLeod, Santa Cruz, all of Calif.

[73] Assignee: Seagate Technology, Inc., Scotts Valley, Calif.

[21] Appl. No.: 205,891

[22] Filed: Mar. 2, 1994

[51] Int. Cl.$^6$ ................................. G11B 17/02
[52] U.S. Cl. ......................... 360/99.12; 360/98.08
[58] Field of Search .............. 360/98.08, 99.05, 360/99.12

[56] References Cited

U.S. PATENT DOCUMENTS

| | | | |
|---|---|---|---|
| 4,065,799 | 12/1977 | Kaczeus | 360/135 |
| 4,429,336 | 1/1984 | Berube et al. | 360/97 |
| 4,471,395 | 9/1984 | Beck et al. | 360/98 |
| 4,561,035 | 12/1985 | McDorman et al. | 360/137 |
| 4,672,488 | 6/1987 | Wright | 360/98 |
| 4,683,505 | 7/1987 | Schmidt et al. | 360/98 |
| 4,847,712 | 7/1989 | Crapo | 360/99.08 |
| 4,893,205 | 1/1990 | Hoppe et al. | 360/104 |
| 4,910,620 | 3/1990 | Olbrich | 360/98.08 |
| 4,965,686 | 10/1990 | Young et al. | 360/98.07 |
| 5,089,922 | 2/1992 | LeClair | 360/99.08 |
| 5,315,463 | 5/1994 | Dew et al. | 360/98.08 |

FOREIGN PATENT DOCUMENTS 56-130867 10/1981 Japan.
63-103485 5/1988 Japan.

Primary Examiner—Robert S. Tupper
Attorney, Agent, or Firm—Flehr, Hohbach, Test, Albritton & Herbert

[57] ABSTRACT

A specially designed disc-mounting hub is provided having a disc-mounting flange protruding from a substantially cylindrical hub portion. A disc-mounting flange has a raised surface about the periphery of the flange upon which the disc rests. A lapped or ground spacer rests on the surface of the hub above the flange, and the disc in a single disc system or the bottommost disc in a multiple disc system rests upon this spacer. The opposite side of the disc in a single disc device is then clamped in place; if a plurality of discs are being utilized, the remainder of the discs are alternately stacked with spacer rings upon the first disc. A clamping ring is attached opposite the disc or discs-mounting flange and working cooperatively with the flange and ground spacer imparts a force upon the disc and spacer ring stack to hold the discs in place.e

2 Claims, 1 Drawing Sheet

HUB-DISC INTERFACE REDUCING HUB RELOADED DISC SURFACE CURVATURE

FIELD OF THE INVENTION

The present invention relates generally to disc drives and particularly to apparatus for mounting a disc or discs to the spindle hub of a disc drive.

BACKGROUND OF THE INVENTION

The present invention is intended to improve on known apparatus used to mount a disc or discs on the spindle hub of a disc drive motor. Conventionally, the motor is located within the spindle hub of the disc drive, and one or more discs coated with magnetic material are attached to the spindle hub.

To facilitate mounting the disc or discs and supporting them in an aligned arrangement about the hub, a flange protrudes from the bottom of the cylindrical hub and the first disc or bottommost discs rest upon that flange. In a multiple disc arrangement alternating spacer rings and discs are stacked upon the first disc. A clamp ring is then attached to the opposite end or top of the cylindrical hub to apply pressure to the disc and spacer ring stack, thereby firmly holding the discs in a fixed position against the cylindrical hub.

In operation of the disc drive, the motor rotatably drives the hub and the disc or discs mounted thereon, allowing the information stored on circumferential tracks on the disc to be accessed by an associated read/write head. Each of these heads floats a small distance above the disc surface to sense the small magnetic signals stored on the tracks on the discs. Firm positioning of the discs is critical to reliable disc drive operation. The magnitude and location of the force imparted by the mounting hub and clamping ring is of critical importance to maintaining the position of the discs. Without proper clamping force, evenly and constantly applied, the discs, especially the first disc abutting the lower flange, will tend to move perpendicular to the direction of rotational motion, causing off-track error. Alternatively, an uneven application of forces, may impart a waviness to the disc. Because of the extremely small gap between the disc and the head flying above the disc in present technology, any waviness in the surface of the disc could cause the head to impact against the disc, causing permanent damage to the surface of the disc or the head.

It has been known to use disc mounting flanges that have been machined to have a flat mounting surface. This provided a large surface area for the disc to rest upon, but did not position the clamping force in an optimal location. In this situation, the clamping forces maximized very close to the cylindrical hub. This form of force distribution tends to bow the spacer disc and spacer stack, causing the discs no longer parallel to each other. Further, this machining of the hub flange is a relatively expensive proposition to implement. A further effort to solve the problem was the adoption of a knife edge or somewhat curved mounting surface at the periphery of the flange upon which the disc rests. However, this arrangement still causes the yielding of the material, which would prevent rework, or even breakage of a glass disc under shock because of the concentration of forces against a very limited portion of the disc. An example of this approach is shown in U.S. Pat. No. 5,089,922.

Thus, the known technology has not provided a solution to the problem of ensuring that a disc sitting against the flange of the hub will stay flat, assuming that the disc was flat to begin with.

SUMMARY OF THE INVENTION

In summary, it is an object of the present invention to find an appropriate means for implementing a flange-disc interface which will maintain the disc flat even over a long-term period.

It is a further objective of the present invention to provide a flange-disc interface which will not cause yielding or breakage of the material even under the significant shocks to which a small disc drive is subjected.

A further objective of the invention is to provide a disc-mounting flange that imparts a clamping force that securely mounts the discs to the hub so that the disc will not move laterally under shock.

Yet another objective of the invention is to provide a flange for mounting discs which will not impart any waviness to the surface of the disc, so that impacts between head and discs are avoided even with a head flying very close to the surface of the disc.

Yet another objective of the invention is to provide a mounting flange which, under clamping force, will provide a surface contact rather than line contact between the flange and the disc or discs to be mounted.

These and other objectives of the present invention are provided by utilizing a specially designed disc-mounting hub having a disc-mounting flange protruding from a substantially cylindrical hub portion. A disc-mounting flange has a raised surface about the periphery of the flange upon which the disc rests. A lapped or ground spacer rests on the surface of the hub above the flange, and the disc in a single disc system or the bottommost disc in a multiple disc system rests upon this spacer. The opposite side of the disc in a single disc device is then clamped in place; if a plurality of discs are being utilized, the remainder of the discs are alternately stacked with spacer rings upon the first disc.

A clamping ring is attached opposite the disc or discs-mounting flange and working cooperatively with the flange and ground spacer imparts a force upon the disc and spacer ring stack to hold the discs in place. The maximum force applied to the stack is in line with the ground spacer so that a firm consistent force is applied to the spacers and discs, and especially to the bottommost disc. Utilizing this arrangement, the disc is maintained very flat, does not adapt any wavy characteristics, multi-disc arrangement remains parallel to the remaining discs in the system.

BRIEF DESCRIPTION OF THE DRAWINGS

Additional objects and features of the invention will be more readily apparent from the following detailed description and dependent claims when taken in conjunction with the drawings in which

DETAILED DESCRIPTION OF A PREFERRED EMBODIMENT

Figure 1:
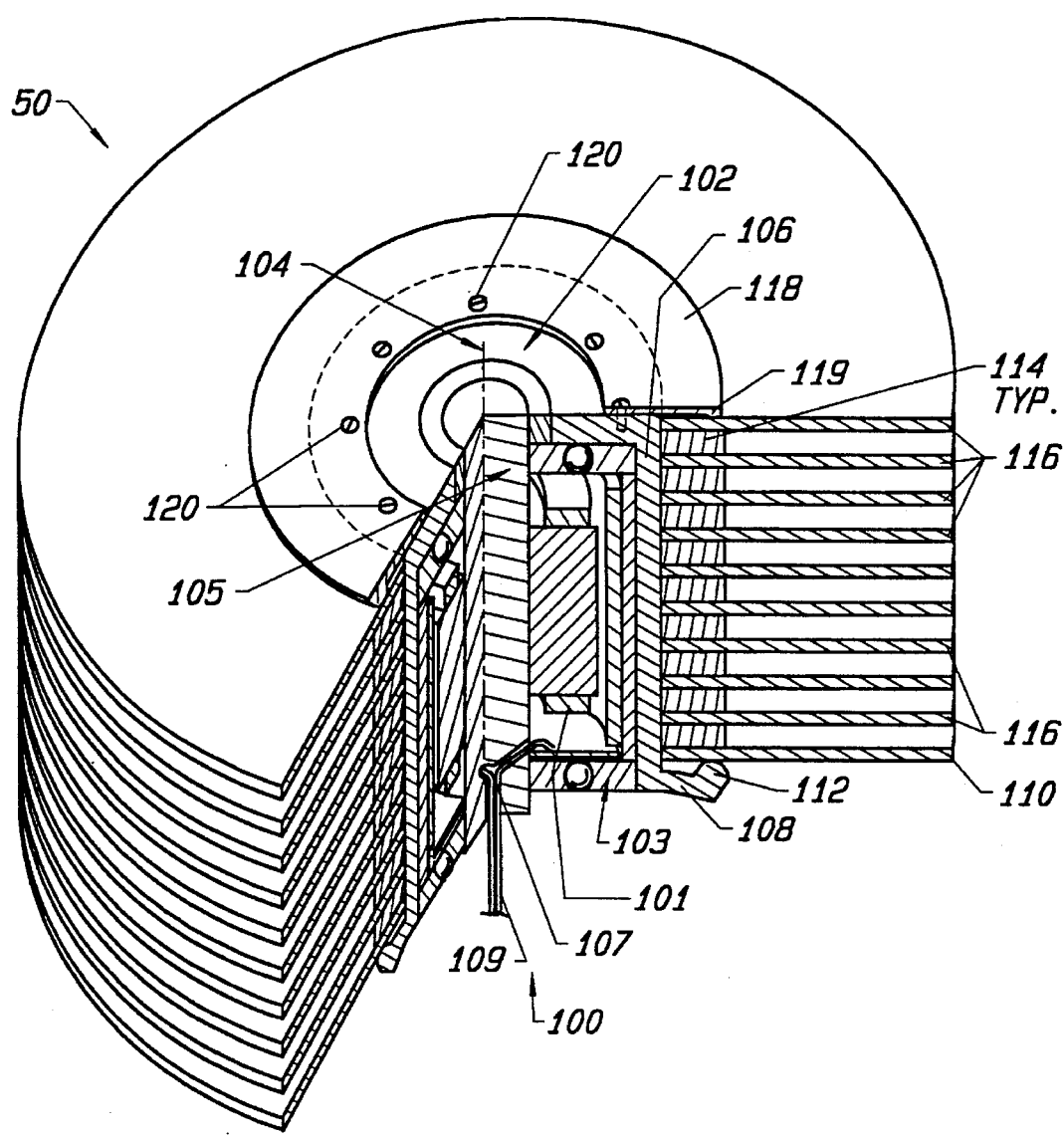
FIG. 1 illustrates the prior art approach to mounting one or more discs on a disc drive hub.

The present invention is primarily concerned with the mounting and support of the first disc 110 which rests on the raised area 112 of the disc-mounting flange 108. The invention is useful both with multi-disc embodiments, and embodiments mounting a single disc for rotation with the rotating hub.

The raised area 112 extends peripherally about the entire circumference of the disc-mounting flange. Spacers 114 and other discs 116 in this multi-disc example are alternately stacked upon the first disc 110. A clamping means which may be of any type well-known in this technology and which in this embodiment is a clamping ring 18, is attached to the cylindrical hub portion 106 at the end opposite the disc-mounting flange 108. The clamping ring 118 is securely fastened by screws 120. In this figure the screws are shown spaced around the periphery of the clamp; in other embodiments other alternatives are available with the objective being to provide an outer circumferential portion of the clamping ring providing a clamping force to the stack of discs 116 and 110 and the spacers 114. The clamping ring 118 cooperates with the disc-mounting flange 108 to securely hold the discs 116 and 110 in a fixed position.

Figure 2:
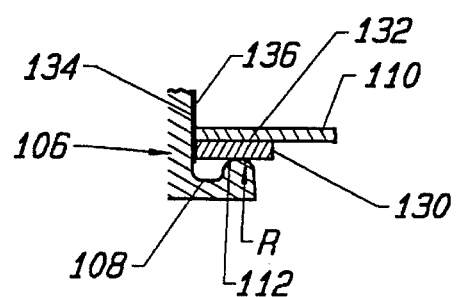
FIG. 2 illustrates a preferred embodiment of the present invention.

While the above described prior art approach to the disc-mounting problem is a satisfactory one in many instances, it is a relatively expensive approach for use in very small disc drives where cost is a factor and the hub-mounting flange is relatively small scale. Therefore, the present invention was motivated by a desire to find an appropriate flange disc interface which does not require costly grinding apparatus on the hub flange surface nor use expensive additional parts, while providing a reliable flat contact between flange and disc so that no warping, scoring, or breakage of the disc under shock will occur. The modification to the apparatus is shown most clearly in FIG. 2. As with the prior art shown in FIG. 1, the hub or shaft supports a raised flange 112. In this embodiment, the hub 106 includes a flange 108 with a raised area 112 to provide support for the disc. In a preferred this raised regin is rounded with a radius R as shown in FIG. 2. Resting atop the raised area 112 is a spacer 130. This spacer is ground or lapped on one side so that the top surface 132 which will be in contact with the disc 110 is flat. Such an operation is relatively inexpensive, especially compared to the cost of grinding smooth the flattened top surface of the raised region 112. The spacer 130 may be held in place by an adhesive between the bottom surface 134 and the raised surface area 112, or by radial contact with the exterior surface 134 of the hub. As an alternative, a plastic shim or sheet 136 may surround the hub 106 and be interposed between both the spacer 130 and the disc 110 and the external surface 134 of the hub 106. In this way, the spacer 130 is quickly held in place by radial contact to the hub 106, but without coming in close direct contact with the hub, thereby enabling rapid assembly of the spacer disc 130 and hub 106 together.

It is apparent from a review of FIG. 2 that the maximum clamping force exerting against the bottom surface of the disc by the upper clamp 118 is now distributed over an area of the disc 110. This causes a reliable extended contact between spacer and disc. Thus, the flange-disc interface includes contact between the lower side 134 of the spacer and the raised rounded surface 113 of the flange 112 and between the smooth upper surface 132 of spacer 130 and first disc 110. This creates an extended surface contact between the disc side 132 of the spacer 130 and the lower surface of the disc 110. In this way, the maximum clamping force imparted to the discs so that they are maintained in aligned fashion without damage to the discs, and the disc and spacer stack is held firmly in place with the discs remaining perpendicular to the hub and parallel to each other.

While the present invention has been described with respect to a particular embodiment, the description is illustrative of the invention is not to be construed as limiting the invention. For example, it is not necessary to use a radius mounting flange as shown in the figures; the mounting flange could have a flat surface extending outwardly from and parallel to the bottom of the hub. Other modifications may occur to those of skill in the art without departing from the spirit and scope of the invention as defined by the following claims.

What is claimed is:

1. A disc-drive motor spindle hub comprising a hub portion supporting a disc and attached to a disc drive motor for rotation thereby;

a disc-mounting flange protruding horizontally from said hub portion and having an upright peripheral portion with a raised rounded area thereon, a flat spacer resting on said raised rounded area, said raised area having a radius to define a generally line contact between said raised rounded area and said flat spacer, said disc resting on said flat spacer, said spacer having a top surface in contact with the bottom surface of said disc that is lapped or ground to provide a smooth surface and clamping means attached at or near an end of said hub portion having a contact area in line with and facing said raised rounded area for applying a clamping force whereby said disc is captured between said clamping means and said raised rounded area via said spacer.

2. A disc-drive motor spindle hub as claimed in claim 1 further comprising a plastic sheet interposed between the outer surface of said hub and the inner surface of said flat spacer to facilitate the assembly of said flat spacer over said hub.

\* \* \* \* \*